United States Patent [19]

Hashimoto

[11] Patent Number: 4,636,883

[45] Date of Patent: Jan. 13, 1987

[54] MAGNETIC HEAD CONTROL APPARATUS

[75] Inventor: Yasuichi Hashimoto, Tokyo, Japan

[73] Assignee: Kabushiki Kaisha Toshiba, Kawasaki, Japan

[21] Appl. No.: 662,627

[22] Filed: Oct. 19, 1984

[30] Foreign Application Priority Data

Oct. 21, 1983 [JP] Japan ................................ 58-197073

[51] Int. Cl.⁴ ............................................... G11B 5/35
[52] U.S. Cl. ...................................................... 360/78
[58] Field of Search ........................................... 360/78

[56] References Cited

U.S. PATENT DOCUMENTS 4,288,731  9/1981  Lee ...................................... 318/618
4,333,117  6/1982  Johnson ................................. 360/78

Primary Examiner—George G. Stellar
Attorney, Agent, or Firm—Cushman, Darby & Cushman

[57] ABSTRACT

A microprocessor is provided for calculating, based on the target track address set in the target address register, the target velocity in the seek operation of the magnetic head up to the target track. When the target velocity of the magnetic head is comparatively large, the microprocessor increases the revision interval of the target velocity, based on a prestored program, such that it is larger than the normal revision interval. The microprocessor varies the target velocity revision interval by a pulse signal output from a circuit which divides the track pulse by ½, for example.

4 Claims, 19 Drawing Figures

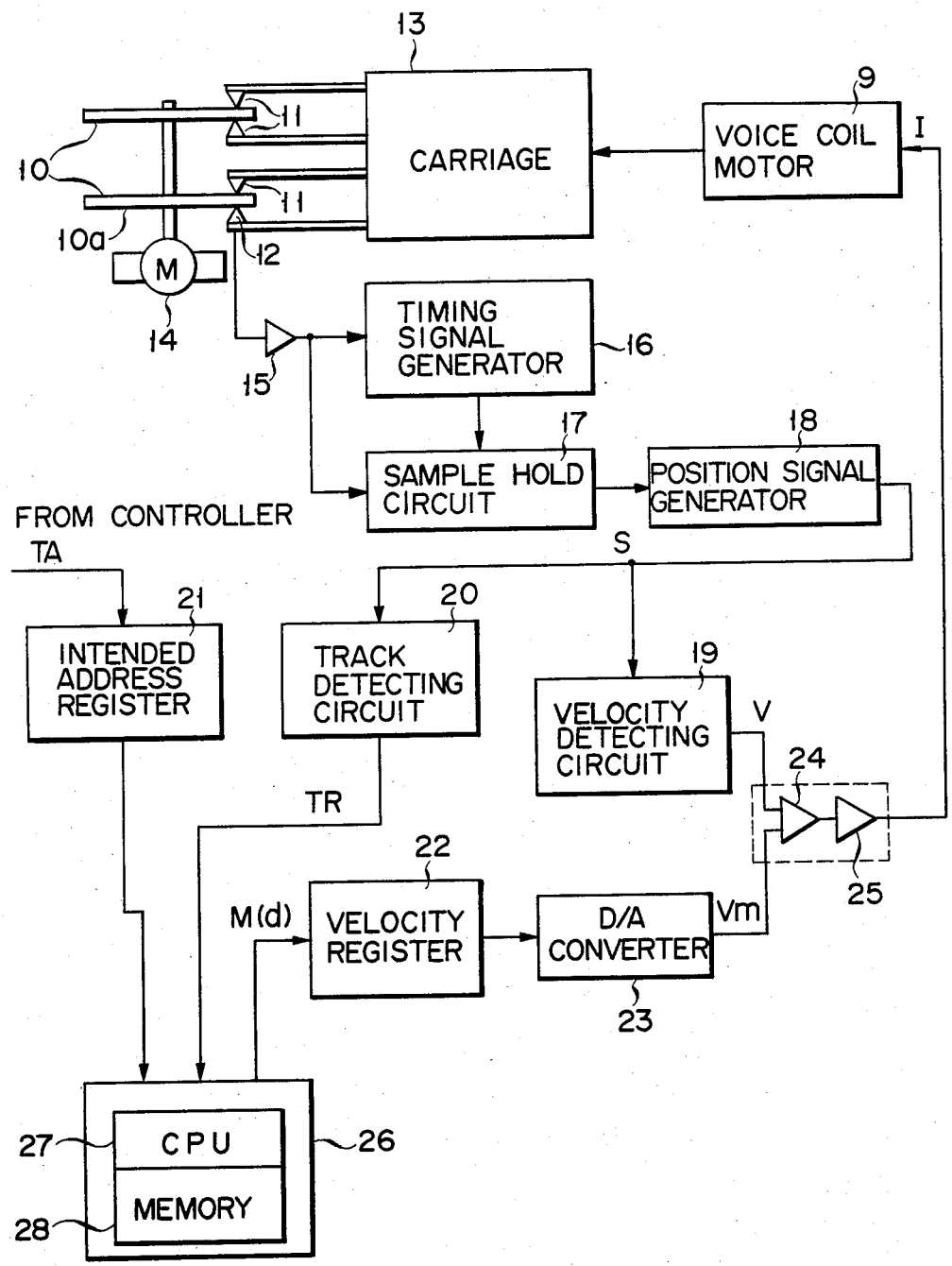

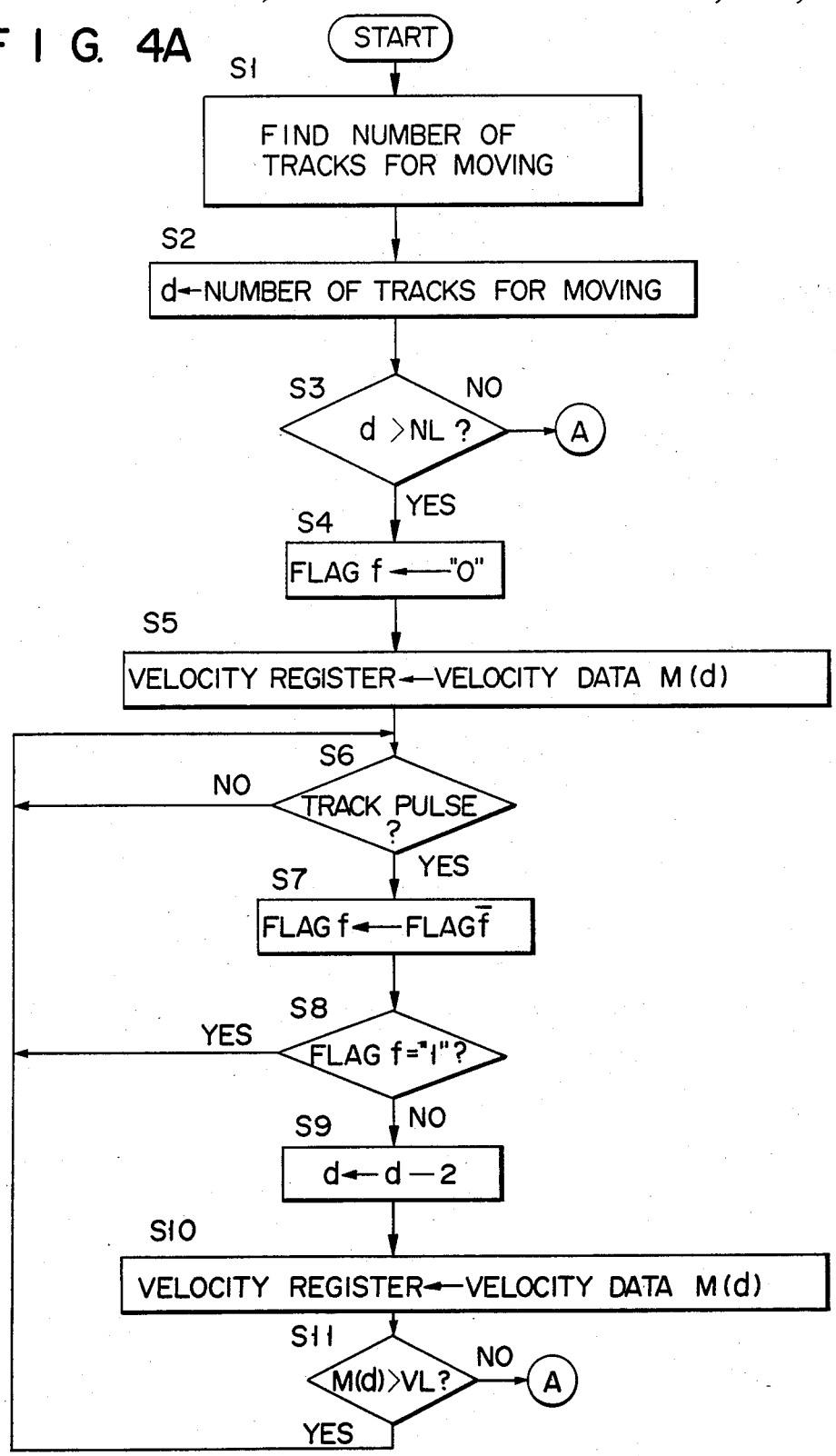

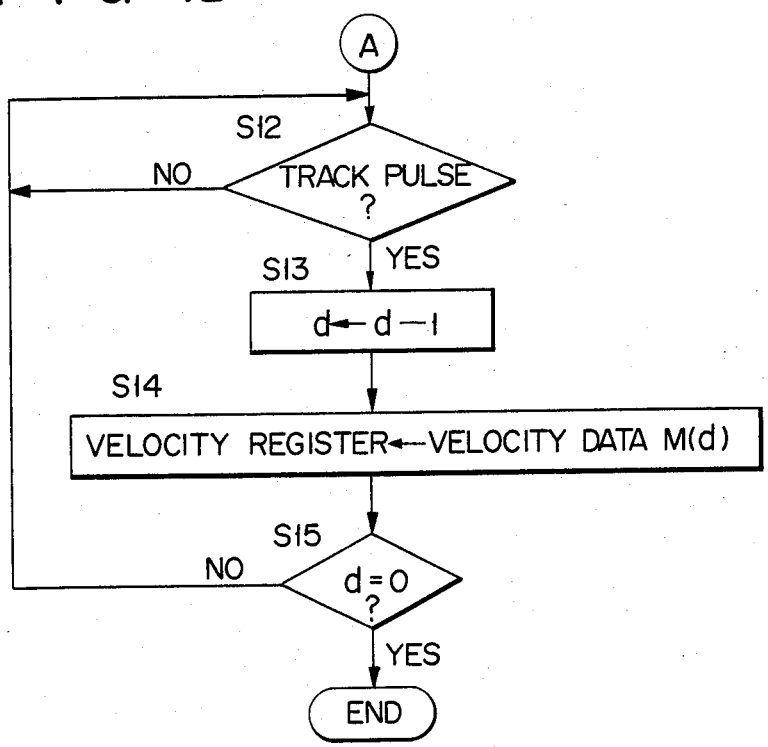
FIG. 4B
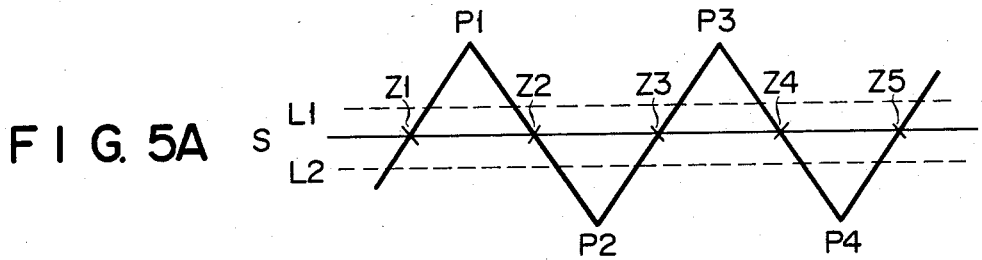
FIG. 5A
FIG. 5B  TR
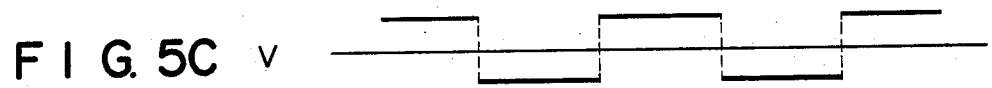
FIG. 5C  V FIG. 7
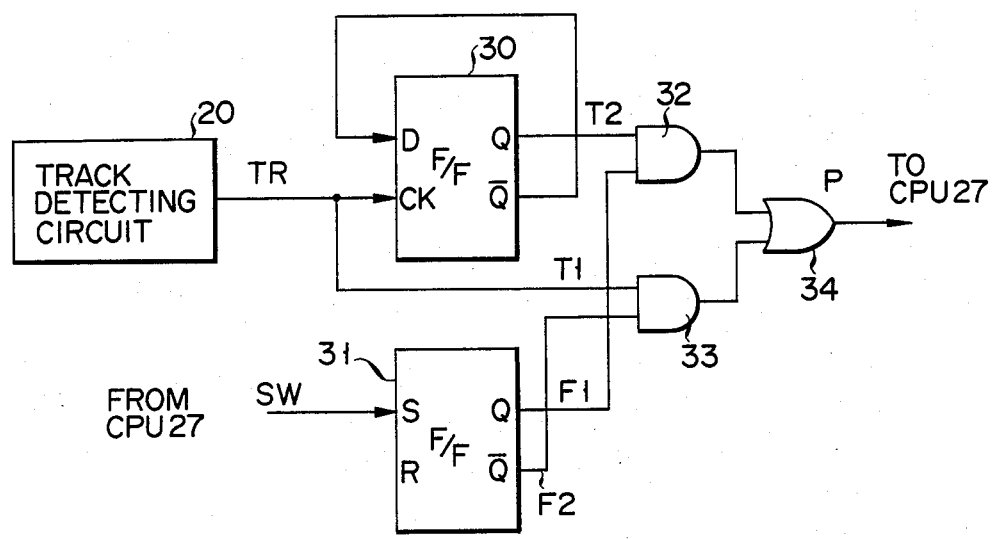
FIG. 8A    TR   
FIG. 8B    T1   
FIG. 8C    T2   
FIG. 8D    F1   
FIG. 8E    F2   
FIG. 8F    P    

MAGNETIC HEAD CONTROL APPARATUS

BACKGROUND OF THE INVENTION

This invention relates to a magnetic head control apparatus for controlling the seek operation of the magnetic head in a magnetic disc apparatus.

In a typical magnetic disc apparatus, after positioning of the magnetic head (hereinafter referred to as a head) in relation to the magnetic disc platter (hereinafter referred to as a magnetic disc) reading/writing of data is performed at a prescribed location on the disc. This kind of positioning operation is referred to as a normal seek operation.

The control system of the seek operation can be divided into positioning control in which the velocity of the head moving to the prescribed target track on the disc is controlled and the head is positioned accurately over that track, and also for transient control of the time after the switch from velocity control to position control.

As is shown in FIG. 1, a head 11 for recording/reproducing data and a head 12 for reproducing servo data are provided in relation to a disc 10. The servo data reproducing head 12 reproduces servo data (position data corresponding to the position of the track on the disc) prestored on the servo surface of disc 10, and extracts the necessary signals for the positioning of head 11. Both heads 11 and 12 are attached to and are transferred by carriage 13, which is driven by a voice coil motor 9, which in turn is driven by a current I from a drive circuit (not shown), and disc 10 is rotated by motor 14.

When, for example, as is shown in FIG. 2A, head 11 performs a seeking operation from track D, which is at point D on disc 10, to track A, which is at point A, a target velocity MV corresponding to the seek distance is set by a controller (not shown). The controller detects the track on which the head is positioned by counting the track pulses from a track detection circuit for each crossing of the center of a track by the head. Then, the controller calculates the distance (i.e., the number of tracks) between the detected track D and the target track A and calculates the target velocity MV based on this distance. The drive circuit supplies current I to voice coil motor 9 based on the target velocity MV set by the controller to transfer head 11 at the target velocity. In the initial period of the seek operation, the head 11 is accelerated by voice coil motor 9, as is illustrated by curve V1 in FIG. 2A, to the target velocity MV shown at E. When the head 11 is moved further and reaches point F, the target velocity MV calculated by the controller is decreased from value G and until it reaches zero at point A. Drive current I is supplied to voice coil motor 9, as shown in FIG. 2B, for moving head 11 in this way. In the seek operation in which head 11 moves from point B, shown in FIG. 2A, to point A, the head 11 moves first with the target velocity set at value H. Then, along with the transfer of the head 11, the target velocity MV is varied from value H to value C by the controller. At this time, when the head 11 starts at point B and moves to point A, head 11 is accelerated as shown by curve V2 in FIG. 2A until it reaches the target velocity value C. Then, head 11 is moved to point A in response to the target velocity MV shown by curve V3 of FIG. 2A. At this time a drive current I such as that shown in FIG. 2C is supplied to voice coil motor 9 from the drive circuit.

With this kind of velocity control in the seek operation, when the seek distance is large and the target velocity MV of the head increases, the transfer of the head necessitates a further revision in the target velocity high speed. The controller revises the target velocity synchronously with the track pulses produced with each movement of the head. When a relatively long seek operation such as from track D to track A is performed, the target velocity is increased so that the actual velocity of the head increases and the interval between track pulses decreases and, consequently, it is difficult for the controller to revise the target velocity synchronously with the track pulses, and at worst the seek accuracy is affected.

SUMMARY OF THE INVENTION

An object of this invention is to provide a magnetic disc control apparatus which can perform a seek operation and revise the target velocity reliably even when the seek distance is long and the transfer velocity of the magnetic head is high.

The present invention provides a magnetic head control apparatus which improves the technique of allowing the magnetic head to seek a target track. When the distance to the target track is relatively long, the target velocity is renewed at an interval greater than the ordinary renewal interval. Specifically, the target velocity is renewed at the timing of the track pulse in the ordinary seek operation in which the target distance is relatively short. On the other hand, where the target distance is relatively long, the target velocity is renewed at the timing of the pulse obtained by frequency-dividing the track pulse by a predetermined value, for example 2. Thus, the present invention recalculates the velocity at every track pulse, or over a predetermined number of track pulses (for example 2).

The apparatus provides a magnetic head control apparatus having a position signal generating circuit which outputs a position signal indicating the actual position of the magnetic head on the magnetic disk. A velocity detection circuit outputs a velocity signal corresponding to the actual velocity of the magnetic head across the disc. A track detection device detects tracks on the magnetic disk and outputs a track pulse for each detected track. A target distance calculating circuit then calculates the distance between the actual position of the magnetic head and the target track to which the head must be driven. The difference between these two tracks is then calculated and output. Comparison means then compare the calculated distance with a preset value. Then, a target velocity generating device generates a target velocity signal corresponding to the target distance at the timing of the pulse obtained by frequency dividing the track pulse by a predetermined value when the target distance calculated by the target distance calculating device is greater than the present limit. On the other hand, the target velocity signal output by the target velocity generating device will correspond to the target distance at the timing of the track pulse when the target distance calculated by the target distance calculating means is smaller than the present limit. Error signal generating means then compares the difference between the actual velocity of the magnetic head and the velocity signal output by the target velocity generating device. Finally, a drive control drives the carriage drive motor in accordance with the difference signal output by the error signal generating device.

With this kind of construction, it is possible to vary the interval during which the target velocity is being revised in relation to the revision interval at the time of normal transfer velocity when the magnetic head is being transferred at high velocity. Consequently, even if the magnetic head is being transferred at high velocity, the target velocity can be reliably revised and the seek operation reliably performed.

BRIEF DESCRIPTION OF THE DRAWINGS

FIG. 3 is a schematic diagram of the magnetic head control apparatus according to the first embodiment of this invention;

FIGS. 4A and 4B are flowcharts showing the operation of the magnetic head control apparatus;

FIG. 5A is a waveform diagram of the position signal generated by the position signal generator shown in FIG. 3;

FIG. 5B is a waveform diagram of the track pulse signal output by the track detection circuit shown in FIG. 3;

FIG. 5C is a waveform diagram of the velocity signal output by the velocity detection circuit shown in FIG. 3;

FIG. 7 is a schematic diagram of the magnetic head control apparatus according to the second embodiment of this invention;

FIGS. 8A to 8F are timing charts of the FIG. 7 circuit operation.

DETAILED DESCRIPTION OF THE PREFERRED EMBODIMENTS

Figure 1:
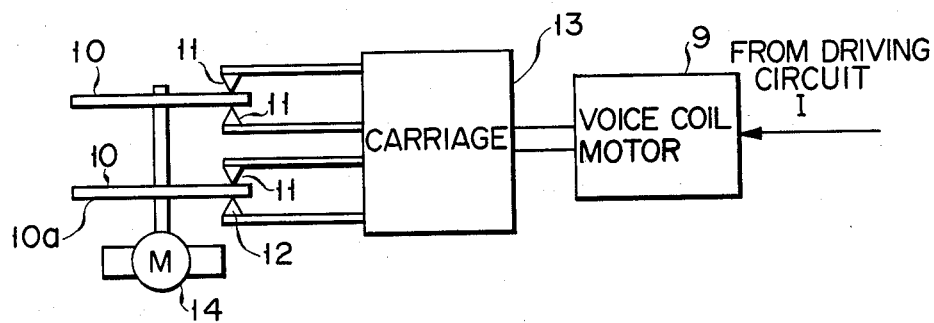
FIG. 1 is a block diagram of the magnetic head of a prior art magnetic disc apparatus.
Figure 2A:
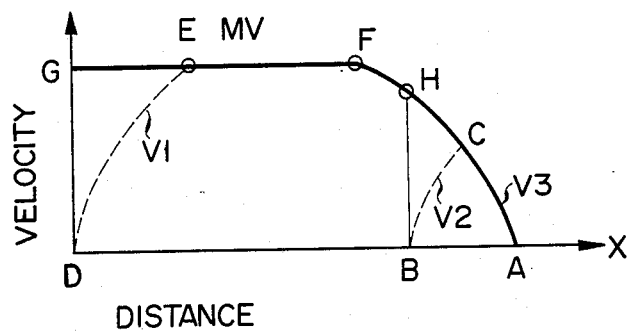
FIG. 2A shows the relationship between the target velocity and the transfer distance of the magnetic head in a prior art magnetic head control operation.
Figure 2B:
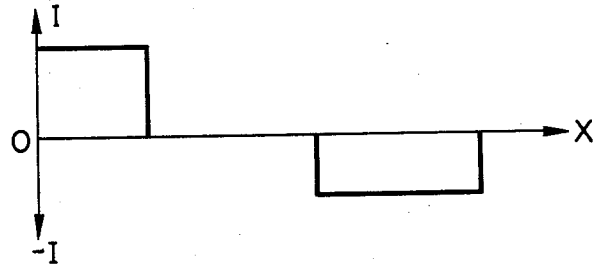
FIGS. 2B and 2C are waveform diagrams of the drive current supplied to the carriage in response to the target velocities shown in FIG. 2A.
Figure 2C:
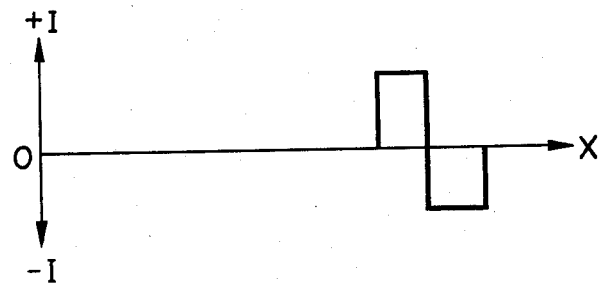

The following is a description of the first embodiment of the invention taken in conjunction with the drawings. FIG. 3 is a schematic drawing of the magnetic head control apparatus according to the first embodiment of the invention. Servo data reproduced from the servo surface 10a of disc 10 by the servo head 12 is supplied to the timing signal generating circuit 16 after being amplified by the amplifier 15. This amplified servo data is also supplied to the sample hold circuit 17. The timing signal generating circuit 16 detects the timing signal included in the servo data and produces a sample signal synchronously with this timing signal. The sample signal is generated synchronously with the timing signal by a normal PLL (phase locked loop) circuit and supplied to the sample hold circuit 17. The sample hold circuit 17 extracts a position data of the head 11 from the servo data based on the sample signal from the timing signal generating circuit 16, and holds the position data.

The position signal generator 18 synthesizes the position signal held by the sample hold circuit 17 and produces a position signal S such as that shown in FIG. 5A. Position signal S has centers of amplitude Z1–Z5 when the position of the head is in the center of the track on disc 10, and the amplitude peaks P1–P4 are the positions of head 11 directly in between the centers of the tracks. Track detecting circuit 20 slices the position signal S at the constant levels L1 and L2 shown in FIG. 5A and supplies a track pulse TR (FIG. 5B) of logical 1 to the data processor 26 when the position signal S is between level L1 and L2, and a track pulse TR of logical 0 at when it is not. The position signal produced by position signal generator 18 is also supplied to the velocity detecting circuit 19. The velocity detecting circuit 19 performs a differentiating operation on the position signal S and produces a velocity signal V, as is shown in FIG. 5C. The absolute value of this velocity signal V expresses the transfer velocity of head 11.

The target track address TA (target track number), which is the transfer destination of head 11, is set in the target address register 21 by the controller (not shown). Data processor 26 has a memory 28 and a microprocessor (CPU) 27 which reads out the target track address TA from the target address register 21 and recognizes the address of the seek destination of head 11. CPU 27 calculates the transfer distance between the present position of the head 11 and the target track as the number of tracks. The target velocity table formed of groups of target velocity data, which correspond to the track number, is preset in memory 28. The CPU 27 reads out target velocity data M(d), which corresponds to the track number from memory 28 and sets it in velocity register 22. The target velocity data M(d) set in velocity register 22 is converted to a target velocity signal Vm, which is the analog (voltage) signal by D/A converter 23 which supplies it to the differential amplifier 24. Differential amplifier 24, which is normally formed with an operational amplifier, detects the difference between the target velocity signal Vm and the velocity signal V, and amplifies the difference. Power amplifier 25 amplifies the output signal of the differential amplifier 24 and supplies it to voice coil motor 9 as drive current I, to drive carriage 13.

The operation of the above apparatus, with CPU 27 as the center, is explained with reference to the flowcharts of FIGS. 4A and 4B. First, power is turned on and head 11 moves to the track 0. Then, as is shown in steps S1 and S2 of the flowchart, the CPU 27 calculates the number of transfer tracks (d) up to the target track to which head 11 is to move in the seek operation. In other words, CPU 27 counts the number of track pulses TR supplied from track detecting circuit 20 and always calculates the present position of head 11 by the number of tracks (present track number PT) using track 0 as the reference. (For every transfer of head 11, an incrementing or decrementing in response to the transfer direction.) Then, the CPU 27 reads out the target track address TA from the target address register 21 and calculates, synchronously with the track pulses TR, the number of transfer tracks (d) in response to the difference between the present track number PT and this target track address TA.

Next, in step S3 it is determined whether the transfer track number d calculated in steps S1 and S2 is larger than the track number limit NL. This track number limit NL is provided to distinguish the case where the transfer track number d is smaller than the track number limit NL and the target velocity of the head 11 for transferring the head 11 a short distance is small, and the case where the transfer track number d is larger than the track number limit NL and the target velocity of the head 11 for moving the head 11 a long distance is large.

In step S3, when the transfer track number d is smaller than the track number limit NL, the processing splits to the routine shown in FIG. 4B. This routine is for when the transfer distance is short and the target velocity is low, as will be explained later. Also, in step S3, when the transfer track number d is larger than the track number limit NL, the processing goes to step S4.

In step S4, the CPU 27 sets the target velocity revision flag f to 0, and in step S5, the target velocity data M(d) corresponding to the transfer track number d is read from the target velocity table of memory 28 and is set in the velocity register 22. Then, when CPU 27 detects the next track pulse TR from the track detecting circuit 20, the flag f is inverted to 1 (steps S6, S7) so that, as shown in step S8, the revision of the target velocity data M(d) is temporarily stopped until the next track pulse TR is detected. Namely, CPU 27 subtracts the transfer track number d two tracks at a time for every two track pulses TR (step S9), and sets the target velocity data M(d) corresponding to transfer track number d in the velocity register 22 (step S10). This operation of revising the target velocity data M(d) for every two track pulses TR is carried out when the condition shown in step 11 is satisfied. Namely, when target velocity data M(d) is larger than the preset velocity limit VL, the CPU 27 revises the target velocity data M(d) every two track pulses TR. The threshold velocity value VL is the value of the target velocity data read out from the target velocity table of memory 28 using the track number limit NL. This value is substantially the same or slightly less than the time required for the target velocity revision processing of CPU 27.

Figure 6A:
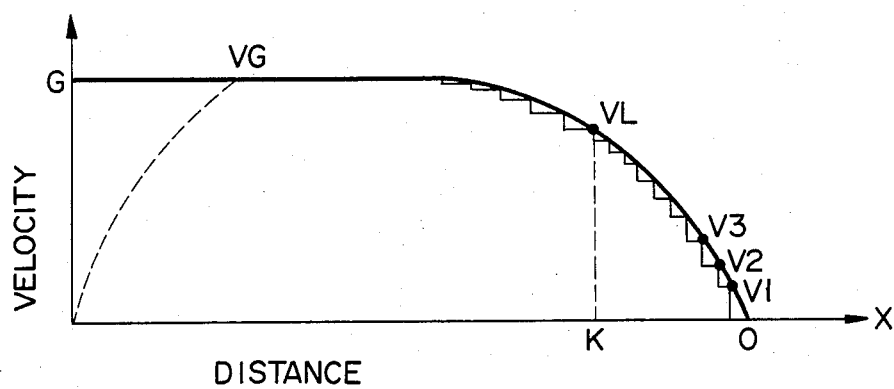
FIG. 6A shows the relationship between the target velocity and the transfer distance of the magnetic head in the magnetic head control operation of this invention.

When this revision processing is completed, the target velocity signal Vm, which corresponds to the target velocity data M(d) set in velocity register 22, is supplied to differential amplifier 24 from the D/A converter 23. With this, head 11 performs the seek operation at a transfer velocity corresponding to the comparatively high velocity of the target velocity signal Vm. At this time, as shown in FIG. 6A, the target velocity data M(d) has a larger velocity value G than the velocity limit VL (corresponding to the transfer number K of tracks). In this case, CPU 27 revises the target velocity data M(d) every two track pulses TR and, accordingly, when head 11 moves at the comparatively high transfer velocity of VG, the revision interval is longer than normal (revision for each track pulse TR) so there is a comparative decrease in the target velocity revison processing volume that the CPU 27 has to perform. Namely, when head 11 is transferred at high velocity, the variations in the target velocity are normally quite small so, even if the revision interval is longer than normal, the difference between the target velocity and the transfer velocity of head 11 is small so no practical problems occur.

Next, when the target velocity data M(d) becomes smaller than the velocity limit VL, the CPU 27, in step S11, goes to the routine shown in FIG. 4B and performs normal revision of the target velocity data M(d) for each track pulse TR, as is shown in the flowchart of FIG. 4B. In other words, CPU 27 subtracts one track from the transfer track number d of head 11 for every detection of a track pulse TR from track detecting circuit 20 (step S12, S13), sets the target velocity data M(d), which corresponds to the transfer track number d, in the velocity register 22 (step S14).

Figure 6B:
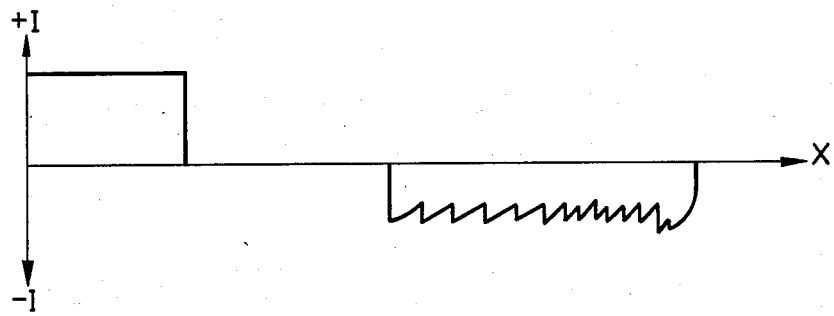
FIG. 6B is a waveform diagram of the drive current supplied to the carriage of FIG. 3 in response to the target velocity shown in FIG. 6A.

This kind of CPU operation results in stepped revision (V1–V3) of the target velocity for every transfer of head 11. That is, when transfer track number d of head 11 is comparatively small and the transfer velocity low, the CPU 27 performs normal target velocity data M(d) revision for each track pulse TR. FIG. 6B shows the waveform of drive current I when supplied to voice coil motor 9 in response to the target velocity shown in FIG. 6A.

FIG. 7 shows a circuit which varies the revision interval of the target velocity executed by the circuit of the second embodiment. This circuit is equipped with D type flip-flops 30, 31 and is constructed such that a track pulse TR from the track detecting circuit 20 is supplied to the clock terminal CK of flip-flop 30. The output signals T2, F1 of flip-flops 30, 31 are each applied to the input terminals of AND circuit 32. Pulse signal T1, which is the track pulse TR, and output signal F2 (inverted signal F1) of flip flop 31 are respectively applied to the other AND circuit 33. The output signals of AND circuits 32, 33 are each supplied to OR circuit 34. The output signal P of this OR circuit 34 is supplied to CPU 27 as a track pulse TR. The peripheral circuits of FIG. 7 are the same as in FIG. 3.

The CPU 27 performs target velocity revision using this kind of circuit. The CPU 27 reads out the target track address TA from the target address register 21 shown in FIG. 3, and calculates the number d of transfer tracks of head 11 based on the target address TA and pulse P of OR circuit 34 of FIG. 7. When the transfer track number d is larger than the track number limit NL, CPU 27 resets flip-flop 31 without outputting a control signal SW and, consequently, a pulse T1 such as that shown in FIG. 8B is supplied to OR circuit 34 from AND circuit 33. With this, a pulse signal P, which matches the track pulse TR shown in FIG. 8A, is supplied to CPU 27 from OR circuit 34 and, accordingly, normal revision of the target velocity is performed synchronously with pulse signal P for each track pulse TR.

Next, when the calculated target velocity data M(d), which corresponds to the number d of the transfer tracks is larger than the track number limit NL, CPU 27 outputs control signal SW to the set terminal S of flip-flop 31 to turn OFF the gate of AND circuit 33 and turn ON the gate of AND circuit 32. Consequently, a pulse signal, which corresponds to the output signal T2 of flip-flop 30, is supplied to OR circuit 34 from AND circuit 32. Output signal T2 is a pulse signal which has been divided to half of track pulse TR by flip-flop 30 and, accordingly, pulse signal P, which corresponds to the signal T2 of FIG. 8C, is supplied to the CPU 27 as the track pulse from the OR circuit 34. In order to perform the revision of the target velocity synchronously with pulse signal P, the revision is performed for every two track pulses TR owing to the halved pulse signal P.

As was described above, according to this invention, it is possible to perform a larger revision of the target velocity revision interval than in the normal revision interval (revision interval for each track pulse TR), when the target velocity data M(d) is comparatively large in response to the seek operation of the head 11 (namely, when the there are a large number of tracks to the target track of the head 11). Accordingly, even if the transfer velocity of head 11 is comparatively high, it is still possible to reliably revise the target velocity because the target velocity revision processing volume has decreased. It is, therefore, possible for head 11 to reliably perform the seek operation.

What is claimed is:

1. A magnetic head control apparatus comprising:
   position signal generating means adapted for driving, with a carriage drive motor, a carriage on which is mounted a magnetic head, said carriage being located in a magnetic disc apparatus for positioning said magnetic head on a specified track of a magnetic disc, said position signal generating means outputting a position signal indicating a position of said magnetic head relative to said magnetic disc;
   velocity detection means, which, based on the position signal output by said position signal generatin means, outputs a velocity signal corresponding to the seeking velocity of said magnetic head relative to said magnetic disc;
   track detection means, which, based on the position signal output by said position signal generating means, outputs a track pulse for each track on said magnetic disc that is passed by said magnetic head;
   target distance calculating means, which, based on the track pulse output by said target detection means, calculates the distance to the target track from the present position of said magnetic head;
   comparing means for comparing the preset limit value and the target distance of said magnetic head calculated by said target distance calculating means;
   target velocity generating means for generating a target velocity signal corresponding to the target distance, said generating being performed at the timing of a pulse obtained by frequency dividing the track pulse by a predetermined value when the target distance calculated by the target distance calculating means is greater than the preset limit, and being performed at the timing of the track pulse when the target distance calculated by the target distance calculating means is smaller than said preset limit;
   error signal generating means for finding the velocity difference between the velocity signal output by said velocity signal generating means and the target velocity signal output by said target velocity generating means; and
   drive control means, which, based on the difference signal output by said error signal generating means, controls the drive of said carriage drive motor.

2. A magnetic head control apparatus according to claim 1 wherein said target velocity generating means includes a table storing predetermined values of target velocity data corresponding to values of target distance, the target velocity data corresponding to the target distance calculated by said target distance calculating means is read out from said table at the timing of one of (a) the track pulse, or (b) the pulse obtained by frequency-dividing said track pulse.

3. A magnetic head control apparatus according to claim 1 wherein said target velocity generating means includes:
   frequency dividing means for frequency-dividing the track pulse provided by said track pulse detection means by a predetermined value; and
   selection means for selecting the pulse generated from the frequency dividing means when the target distance is greater than said preset limit, and for selecting the track pulse when the target distance is smaller than said preset limit, said selection being performed in accordance with the result of the comparison carried out in said comparing means.

4. A magnetic head control apparatus according to claim 2 wherein said target velocity generating means includes:
   frequency dividing means for frequency-dividing the track pulse provided by said track pulse detection means by a predetermined value; and
   selection means for selecting the pulse generated from the frequency dividing means when the target distance is greater than said preset limit, and for selecting the track pulse when the target distance is smaller than said preset limit, said selection being performed in accordance with the result of the comparison carried out in said comparing means.

* * * * *